US005672639A

United States Patent [19]
Corvasce et al.

[11] Patent Number: 5,672,639
[45] Date of Patent: Sep. 30, 1997

[54] STARCH COMPOSITE REINFORCED RUBBER COMPOSITION AND TIRE WITH AT LEAST ONE COMPONENT THEREOF

[75] Inventors: Filomeno Gennaro Corvasce, Mertzig, Italy; Tom Dominique Linster, Gilsdorf; Georges Thielen, Ettelbruck, both of Luxembourg

[73] Assignee: The Goodyear Tire & Rubber Company, Akron, Ohio

[21] Appl. No.: 614,983

[22] Filed: Mar. 12, 1996

[51] Int. Cl.[6] ............................................. C08L 3/04
[52] U.S. Cl. ............... 524/52; 524/571; 524/575.5; 524/577; 524/579; 152/450; 264/216
[58] Field of Search ................ 524/52, 571, 575.5, 524/577, 579; 152/450; 264/216

[56] References Cited

U.S. PATENT DOCUMENTS 5,374,671  12/1994  Corvace et al. ......................... 504/47
5,417,679  5/1995  Toms et al. ............................. 604/370

Primary Examiner—Peter D. Mulcahy
Attorney, Agent, or Firm—Henry C. Young, Jr.

[57] ABSTRACT

The present invention relates to a rubber composition containing a starch/plasticizer composite and to pneumatic tires having at least one component comprised of such rubber composition. Such tire component can be, for example, its circumferential tread or other component of the tire.

The starch/plasticizer composite can be a composite of starch and plasticizer such as, for example, poly(ethylenevinyl alcohol) and/or cellulose acetate or any suitable plasticizer which results in such starch/plasticizer composite having a melting point below that of the starch alone, and particularly below about 160° C., and to thereby enable the starch to be more processable with conventional elastomer composition processing equipment.

In the practice of this invention, a rubber composition comprises at least one elastomer, a starch/plasticizer composite, optionally at least one coupler and, optionally, at least one of carbon black and silica reinforcement alone or in conjunction with another reinforcing or non-reinforcing filler.

90 Claims, No Drawings

STARCH COMPOSITE REINFORCED RUBBER COMPOSITION AND TIRE WITH AT LEAST ONE COMPONENT THEREOF

FIELD

This invention relates to rubber compositions which contain a starch/plasticizer composite, particularly as elastomer reinforcement, and to tires having at least one component thereof. Such component can, for example, be the tire's circumferential tread or other component of the tire. In one aspect, the rubber composition is comprised of rubber, particularly sulfur curable, or sulfur cured, rubber, reinforced with a combination of starch/plasticizer composite and, optionally, coupling agent, alternatively also containing carbon black and/or silica alone or in conjunction with another reinforcing or non-reinforcing filler.

BACKGROUND

Starch has sometimes been suggested for use in elastomer formulations for various purposes. It is considered herein that elastomer formulations, or compositions, containing starch can be developed by utilizing a suitable plasticizer in combination with the starch as will be hereinafter discussed. Such starch/plasticizer compositions might be used alone or in conjunction with silica and/or carbon black reinforcing fillers or also with other fillers such as, for example, recycled, or ground, vulcanized rubber particles, short fibers, kaolin clay, mica, talc, titanium oxide and limestone. Such short fibers can be, for example, fibers of cellulose, aramid, nylon, polyester and carbon composition.

U.S. Pat. Nos. 5,403,923, 5,258,430, and 4,900,361 disclose the preparation and use of various starch compositions.

Starch is typically represented as a carbohydrate polymer having repeating units of amylose (anhydroglucopyranose units joined by glucosidic bonds) and amylopectin, a branched chain structure, as is well known to those having skill in such art. Typically, starch is composed of about 25 percent amylose and about 75 percent amylopectin. (*The Condensed Chemical Dictionary, Ninth Edition* (1977)), revised by G. G. Hawley, published by Van Nostrand Reinhold Company, page 813). Starch can be, reportedly, a reserve polysaccharide in plants such as, for example, corn, potatoes, rice and wheat as typical commercial sources.

In one aspect, starch has previously been suggested for use in rubber products. However, starch by itself, typically having a softening point of about 200° C. or above, is considered herein to have a somewhat limited use in many rubber products, primarily because rubber compositions are normally processed by preliminarily blending rubber with various ingredients at temperatures in a range of about 140° C. to about 170° C., usually at least about 160° C., and sometimes up to 180° C. which is not a high enough temperature to cause the starch (with softening temperature of at least about 200° C.) to effectively melt and efficiently blend with the rubber composition. As a result, the starch particles tend to remain in individual domains, or granules, within the rubber composition rather than as a more homogeneous blend.

Thus, it is considered herein that such softening point disadvantage has rather severely limited the use of starch as a filler, particularly as a reinforcing filler, for many rubber products.

It is considered herein that a development of a starch/plasticizer composition, or compositions, with a softening point significantly lower than that of the starch alone may allow the starch to be more easily mixed and processed in conventional elastomer processing equipment.

As to reinforcement for various rubber compositions which require high strength and abrasion resistance, particularly applications such as tires and various industrial products, sulfur cured rubber is utilized which normally contain substantial amounts of reinforcing fillers, often in a range of about 35 to about 85 or even up to 120, parts by weight per 100 parts rubber (phr).

Carbon black, and sometimes silica, usually precipitated silica, is commonly used as reinforcing filler for such purpose and normally provide or enhance good physical properties for the sulfur cured rubber. Particulate silica, when used for such purpose, is often used in conjunction with a coupling agent and usually in combination with carbon black. The use of carbon black and silica as reinforcing fillers for elastomers, including sulfur curable elastomers, is well known to those skilled in such art.

It is important to appreciate that, conventionally, carbon black is a considerably more effective reinforcing filler for rubber products, and particularly for rubber tire treads than silica if the silica is used without a coupling agent, or silica coupler or silica adhesion agent as it may be sometimes referred to herein. Use of coupling agents with precipitated silica for reinforcing sulfur curable elastomers is well known to those skilled in such art.

Such coupling agents contain two moieties, one moiety to interact chemically or physicochemically with the reinforcing filler, apparently, for example, with hydroxyl groups on its surface (e.g. SiOH), and another moiety to interact with one or more of the elastomers, particularly diene-based, sulfur curable elastomers. Such coupling agent may, for example, be premixed, or pre-reacted, with the silica particles or added to the rubber mix during a rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are sometimes composed of a silane which has a constituent component, or moiety, (the silane portion) capable of reacting with the silica surface (e.g. SiOH) and, also, a constituent component, or moiety, capable of reacting with the rubber, particularly a sulfur vulcanizable rubber which contains carbon-to-carbon double bonds, or unsaturation such as, for example, a diene-based elastomer. In this manner, then the coupler acts as a connecting bridge between the silica and the rubber and thereby enhances the rubber reinforcement aspect of the silica.

In one aspect, the silane of the coupling agent apparently forms a bond to the silica surface and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica.

The rubber-reactive group component of the coupler may be, for example, one or more of groups such as mercapto, amino, vinyl, epoxy, and sulfur groups, and is often a sulfur or mercapto moiety and more usually sulfur.

Numerous coupling agents are taught for use in combining silica and rubber, such as, for example, silane coupling agents containing a polysulfide component, or structure, such as, for example, trialkoxyorganosilane polysulfides containing from 2 to 8 sulfur atoms in a polysulfide bridge such as, for example, bis-(3-triethoxysilylpropyl) tetrasulfide and/or trisulfide.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "carbon black" as used herein means "carbon blacks having properties typically used in the reinforcement of elastomers, particularly sulfur curable elastomers".

The term "silica" as used herein can relate to precipitated or fumed silica and typically relates to precipitated silica, which is well known to those having skill in such art.

A reference to an elastomer's Tg refers to its glass transition temperature, which can conveniently be determined by a differential scanning calorimeter at a heating rate of 10° C. per minute.

SUMMARY AND PRACTICE OF THE INVENTION

In accordance with one aspect of this invention, a rubber composition is provided which comprises (A) 100 parts by weight of at least one diene-based elastomer, (B) about 0.1 to about 120, alternatively about 25 to about 90, phr of at least one elastomer reinforcing filler composed of (i) about 0.1 to about 120, alternatively about 5 to about 70, phr of at least one starch/synthetic plasticizer composite and (ii) zero to about 90, alternatively about 20 to about 85, phr of (a) carbon black and/or silica, or (b) carbon black and/or silica and at least one additional inorganic reinforcing or non-reinforcing filler and (C) optionally a coupler for said starch composite and silica, if silica is used, where said coupler has a moiety reactive with the surface of said starch composite and the surface of said silica, as the case may be, and a moiety interactive with the said elastomer; wherein said starch is composed of amylose units and amylopectin units in a ratio of about 15/85 to about 35/65, alternatively about 20/80 to about 30/70, and has a softening point according to ASTM No. D1228 in a range of about 180° C. to about 220° C.; and the starch/plasticizer has a softening point in a range of about 110° C. to about 170° C. according to ASTM No. D1228.

The moiety of the coupler reactive with the starch/plasticizer composite and silica surfaces is generally considered herein as being capable of reacting with at least one or more hydroxyl groups on their surfaces and possibly with other reactive groups thereon.

In the practice of this invention, the starch/plasticizer composite may be desired to be used, for example, as a free flowing, dry powder or in a free flowing, dry pelletized form. In practice, it is desired that the synthetic plasticizer itself is compatible with the starch, and has a softening point lower than the softening point of the starch so that it causes the softening of the blend of the plasticizer and the starch to be lower than that of the starch alone. This phenomenon of blends of compatible polymers of differing softening points having a softening point lower than the highest softening point of the individual polymer(s) in the blend is well known to those having skill in such art.

For the purposes of this invention, the plasticizer effect for the starch/plasticizer composite, (meaning a softening point of the composite being lower than the softening point of the starch), can be obtained through use of a polymeric plasticizer such as, for example, poly(ethylenevinyl alcohol) with a softening point of less than 160° C. Other plasticizers, and their mixtures, are contemplated for use in this invention, provided that they have softening points of less than the softening point of the starch, and preferably less than 160° C., which might be, for example, one or more copolymers and hydrolyzed copolymers thereof selected from ethylene-vinyl acetate copolymers having a vinyl acetate molar content of from about 5 to about 90, alternatively about 20 to about 70, percent, ethylene-glycidal acrylate copolymers and ethylene-maleic anhydride copolymers. As hereinbefore stated hydrolysed forms of copolymers are also contemplated. For example, the corresponding ethylene-vinyl alcohol copolymers, and ethylene-acetate vinyl alcohol terpolymers may be contemplated so long as they have a softening point lower than that of the starch and preferably lower than 160° C.

In general, the blending of the starch and plasticizer involves what are considered or believed herein to be relatively strong chemical and/or physical interactions between the starch and the plasticizer.

In general, the starch/plasticizer composite has a desired starch to plasticizer weight ratio in a range of about 0.5/1 to about 4/1, alternatively about 1/1 to about 2/1, so long as the starch/plasticizer composition has the required softening point range, and preferably, is capable of being a free flowing, dry powder or extruded pellets, before it is mixed with the elastomer(s).

While the synthetic plasticizer(s) may have a viscous nature at room temperature, or at about 23° C. and, thus, considered to be a liquid for the purposes of this description, although the plasticizer may actually be a viscous liquid at room temperature since it is to be appreciated that many plasticizers are polymeric in nature.

Representative examples of synthetic plasticizers are, for example, poly(ethylenevinyl alcohol), cellulose acetate and diesters of dibasic organic acids, so long as they have a softening point sufficiently below the softening point of the starch with which they are being combined so that the starch/plasticizer composite has the required softening point range.

Preferably, the synthetic plasticizer is selected from at least one of poly(ethylenevinyl alcohol) and cellulose acetate.

For example, the aforesaid poly(ethylenevinyl alcohol) might be prepared by polymerizing vinyl acetate to form a poly(vinylacetate) which is then hydrolyzed (acid or base catalyzed) to form the poly(ethylenevinyl alcohol). Such reaction of vinyl acetate and hydrolyzing of the resulting product is well known those skilled in such art.

For example, vinylalcohol/ethylene (60/40 mole ratio) copolymers can be obtained in powder forms at different molecular weights and crystallinities such as, for example, a molecular weight of about 11700 with an average particle size of about 11.5 microns or a molecular weight (weight average) of about 60,000 with an average particle diameter of less than 50 microns.

Various blends of starch and ethylenevinyl alcohol copolymers can then be prepared according to mixing procedures well known to those having skill in such art. For example, a procedure might be utilized according to a recitation in the patent publication by Bastioli, Bellotti and Del Trediu entitled "A Polymer Composition Including Destructured Starch An Ethylene Copolymer", U.S. Pat. No. 5,403,374.

Other plasticizers might be prepared, for example and so long as they have the appropriate Tg and starch compatibility requirements, by reacting one or more appropriate organic dibasic acids with aliphatic or aromatic diol(s) in a reaction which might sometimes be referred to as an esterification condensation reaction. Such esterification reactions are well known to those skilled in such art.

In the practice of this invention, the aforesaid inorganic fillers may be, for example, selected from one or more of kaolin clay, talc, short discrete fibers, thermoplastic powders such as polyethylene and polypropylene particles, or other reinforcing or non-reinforcing inorganic fillers.

Such additional inorganic fillers are intended to be exclusive of, or to not include, pigments conventionally used in the compounding, or preparation of, rubber compositions such as zinc oxide, titanium oxide and the like.

Such additional short fibers may be, for example, of organic polymeric materials such as cellulose, aramid, nylon and polyester.

In practice, the said starch/synthetic plasticizer composite has a moisture content in a range of about zero to about 30, alternatively about one to about six, weight percent.

In practice, as hereinbefore pointed out, the elastomer reinforcement may be (i) the starch/plasticizer composite or (ii) a combination of the starch/plasticizer composite and at least one of carbon black and precipitated silica or (iii) a combination of the starch/plasticizer, carbon black and/or precipitated silica and at least one other inorganic filler, wherein a coupler is optionally used to couple the starch composite and the silica, if silica is used, to the diene based elastomer(s).

It is considered herein that, where desired, the starch composite can be used as (i) a partial or (ii) complete replacement for carbon black and/or silica reinforcement for sulfur vulcanizable elastomers, depending somewhat upon the properties desired for the cured, or vulcanized, rubber composition.

In practice, it is generally preferred that the rubber reinforcing carbon black is used in conjunction with the starch composite in an amount of at least 5 and preferably at least 35 phr of carbon black, depending somewhat upon the structure of the carbon black. Carbon black structure is often represented by its DBP (dibutylphthalate) value. Reinforcing carbon blacks typically have a DBP number in a range of about 40 to about 400 cc/100 gm, and more usually in a range of about 80 to about 300 (ASTM D 1265). If the carbon black content is used with a view to providing an elastomer composition with a suitable electrical conductivity to retard or prevent appreciable static electricity build up, a minimum amount of carbon black in the elastomer composition might be, for example, about 10 phr if a highly electrically conductive carbon black is used, otherwise usually at least about 25 and often at least about 35 phr of carbon black is used.

If desired, and on a practical basis, it is usually preferred that the coupler for the starch/plasticizer composite can be the same coupler as could be used for the silica, if silica is used. Thus, it is considered herein that the moiety of the coupler reactive with the surface of the starch/plasticizer composite is also reactive with the hydroxyl (e.g. SiOH) groups, and/or other reactive groups, typically on the surface of the silica.

It is important to appreciate that, preferably, the starch composite is not used as a total replacement for carbon black and/or silica in an elastomer composition. Thus, in one aspect, it is considered that the starch composite is to be typically used as a partial replacement for carbon black and/or silica reinforcement for sulfur vulcanizable elastomers.

It is important to appreciate that, while the starch may be used in combination with the starch/plasticizer composite, they are not considered herein as equal alternatives. Thus, while starch might sometimes be considered suitable as a reinforcement for the elastomer composition together with the coupler, the starch/plasticizer composite itself may be considered more desirable for some applications, even when used without a coupler.

If silica is used as a reinforcement together with carbon black, the weight ratio of silica to carbon black is desirably in a weight ratio in a range of about 0.1/1 to about 10/1, thus at least 0.1/1, alternatively at least about 0.9/1, optionally at least 3/1 and sometimes at least 10/1.

The weight ratio of said silica coupler to the starch composite and silica, if silica is used, may, for example, be in a range of about 0.01/1 to about 0.2/1 or even up to about 0.4/1.

The starch is recited as being composed of amylose units and/or amylopectin units. These are well known components of starch. Typically, the starch is composed of a combination of the amylose and amylopectin units in a ratio of about 25/75. A somewhat broader range of ratios of amylose to amylopectin units is recited herein in order to provide a starch for the starch composite which interact with the plasticizer somewhat differently. For example, it is considered herein that suitable ratios may be from about 20/80 up to 100/0, although a more suitable range is considered to be about 15/85 to about 35/63.

The starch can typically be obtained from naturally occurring plants, as hereinbefore referenced. The starch/plasticizer composition can be present in various particulate forms such as, for example, fibrils, spheres or macromolecules, which may, in one aspect, depend somewhat upon the ratio of amylose to amylopectin in the starch as well as the plasticizer content in the composite.

The relative importance, if any, of such forms of the starch is the difference in their reinforcing associated with the filler morphology. The morphology of the filler primarily determines the final shape of the starch composite within the elastomer composition, in addition, the severity of the mixing conditions such as high shear and elevated temperature can allow to optimize the final filler morphology. Thus, the starch composite, after mixing, may be in a shape of one or more of hereinbefore described forms.

It is important to appreciate that the starch, by itself, is hydrophilic in nature, meaning that it has a strong tendency to bind or absorb water. Thus, the moisture content for the starch and/or starch composite has been previously discussed herein. This is considered to be an important, or desirable, feature in the practice of this invention because water can also act somewhat as a plasticizer with the starch and which can sometimes associate with the plasticizer itself for the starch composite such as polyvinyl alcohol and cellulose acetate, or other plasticizer which contain similar functionalities such as esters of polyvinyl alcohol and/or cellulose acetate or any plasticizer which can depress the melting point of the starch.

Various grades of the starch/plasticizer composition can be developed to be used with various elastomer compositions and processing conditions.

As hereinbefore pointed out, the starch typically has a softening point in a range of about 180° C. to about 220° C., depending somewhat upon its ratio of amylose to amylopectin units, as well as other factors and, thus, does not readily soften when the rubber is conventionally mixed, for example, at a temperature in a range of about 140° C. to about 165° C. Accordingly, after the rubber is mixed, the starch remains in a solid particulate form, although it may become somewhat elongated under the higher shear forces generated while the rubber is being mixed with its compounding ingredients. Thus, the starch remains largely incompatible with the rubber and is typically present in the rubber composition in individual domains.

However, it is now considered herein that providing starch in a form of a starch composite of starch and a plasticizer is particularly beneficial in providing such a composition with a softening point in a range of about 110° C. to about 160° C.

The plasticizers can typically be combined with the starch such as, for example, by appropriate physical mixing processes, particularly mixing processes that provide adequate shear force.

The combination of starch and, for example, polyvinyl alcohol or cellulose acetate, is referred to herein as a "composite". Although the exact mechanism may not be completely understood, it is believed that the combination is not a simple mixture but is a result of chemical and/or physical interactions. It is believed that the interactions lead to a configuration where the starch molecules interact via the amylose with the vinyl alcohol, for example, of the plasticizer molecule to form complexes, involving perhaps chain entanglements. The large individual amylose molecules are believed to be interconnected at several points per molecule with the individual amylopectine molecules as a result of hydrogen bonding (which might otherwise also be in the nature of hydrophilic interactions).

This is considered herein to be beneficial because by varying the content and/or ratios of natural and synthetic components of the starch composite it is believed to be possible to alter the balance between hydrophobic and hydrophilic interactions between the starch components and the plasticizer to allow, for example, the starch composite filler to vary in form from spherical particles to fibrils.

In particular, it is considered herein that adding a polyvinyl alcohol to the starch to form a composite thereof, particularly when the polyvinyl alcohol has a softening point in a range of about 90° C. to about 130° C., can be beneficial to provide resulting starch/plasticizer composite having a softening point in a range of about 110° C. to about 160° C., and thereby provide a starch composite for blending well with a rubber composition during its mixing stage at a temperature, for example, in a range of about 110° C. to about 165° C. or 170° C.

In a further aspect of the invention, a tire is provided having at least one component comprised of the said starch/plasticizer composite-containing rubber composition of this invention. Although not limited thereto, such tire components can be at least one of tread, tread base or tread undertread, tire innerliner, sidewall apexes, wedges for the tire shoulder, sidewall, carcass ply and breaker wire coating rubber compositions, bead insulation rubber composition and cushion or gumstrips for addition to various parts of the tire construction. As used herein, the tread and tread base may be collectively referred to herein as the "tread", or "circumferential tread". Such tire components are well known those skilled in such art.

As an aspect feature of this invention, a tire is provided having a circumferential tread comprised of the said rubber composition of this invention with the aforesaid tire component, thus, being its tread. As is well known to those skilled in such art, such tire tread is typically designed to be ground-contacting.

As a further aspect of this invention, a tire is provided with sidewall apexes of the said rubber composition of this invention.

Historically, the more homogeneous the dispersion of rubber compound components into the rubber, the better the resultant cured properties of that rubber. It is considered herein that it is a particular feature of this invention that the starch composite mixes with the rubber composition during the rubber mixing under high shear conditions and at a temperature in a range of about 140° C. to about 165° C., in a manner that very good dispersion in the rubber mixture is obtained. This is considered herein to be important because upon mixing the elastomer composition containing the starch/plasticizer composite to a temperature to reach the melting point temperature of the composite, the starch composite will contribute to the development of high shearing forces which is considered to be beneficial to ingredient dispersion within the rubber composition. Above the melting point of the starch composite, for example, around 150° C., it will melt and maximize its reaction with the coupling agent.

In one aspect, such a rubber composition can be provided as being sulfur cured. The sulfur curing is accomplished in a conventional manner, namely, by curing under conditions of elevated temperature and pressure for a suitable period of time.

In the practice of this invention, as hereinbefore pointed out, the rubber composition is comprised of at least one diene-based elastomer, or rubber. Thus, it is considered that the elastomer is a sulfur curable elastomer. The diene based elastomer may be selected from at least one of homopolymers of isoprene and 1,3-butadiene and copolymers of isoprene and/or 1,3-butadiene with a aromatic vinyl compound selected from at least one of styrene and alphamethylstyrene. Accordingly such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber and medium to high vinyl polybutadiene rubber having a vinyl 1,2- content in a range of about 15 to about 85 percent and emulsion polymerization prepared butadiene/acrylonitrile copolymers. Such medium to high vinyl polybutadiene rubber may be more simply referred to herein as a high vinyl polybutadiene.

The rubber composition is preferably of at least two diene based rubbers.

In one aspect, an emulsion polymerization derived styrene/butadiene (E-SBR) might be used having a relatively conventional styrene content of about 20 to about 30 percent bound styrene or, for some applications, an E-SBR having a medium to relatively high bound styrene content, namely, a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%.

Emulsion polymerization prepared styrene/butadiene/ acrylonitrile copolymer rubbers (E-SBAR) containing about 2 to about 50 weight percent bound acrylonitrile in the terpolymer are also contemplated as diene based rubbers for use in this invention.

The solution polymerization prepared SBR (S-SBR) typically has a bound styrene content in a range of about 5 to about 50, preferably about 9 to about 36, percent. Its' butadiene portion may have a vinyl content in a range of about 10 to about 50 percent. The S-SBR can be conveniently prepared, for example, by organo lithium catalyzation in the presence of an organic hydrocarbon solvent.

A purpose of using S-SBR is to enhance tire rolling resistance since it should tend to promote lower hysteresis for tire tread compositions.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The commonly employed siliceous pigments used in rubber compounding applications can be used as the silica in this invention, including pyrogenic and precipitated siliceous pigments (silica), although precipitate silicas are preferred.

The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 50 to about 400, and more usually about 100 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc.; silicas available from Rhone-Poulenc, with, for example, Zeosil 1165MP and silicas available from Degussa AG with, for example, designations VN2 and VN3, as well as other grades of silica, particularly precipitated silicas, which can be used for elastomer reinforcement.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 1 to about 5 phr. Often microcrystalline waxes are used. Typical amounts of peptizers comprise about 0.1 to about 1 phr.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent, or peroxide cure systems, and accelerator(s), if used, are not considered to be an aspect of this invention which is more primarily directed to the use of said starch composite as a reinforcing filler in combination with a coupler and carbon black and/or silica.

The presence and relative amounts of the above additives are not considered to be an aspect of the present invention which is more primarily directed to the utilization of specified blends of rubbers in rubber compositions, in combination with the said starch/plasticizer composite together with carbon black and/or optionally silica and/or non-carbon black or non-silica filler, and a coupler for the starch/plasticizer composite and silica, as the case may be, for the reinforcement of the rubber.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, starch composite, and fillers such as carbon black and optional silica and coupler, and/or non-carbon black and non-silica fillers, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, a starch composite was evaluated as partial replacement for carbon black reinforcement as a rubber reinforcement alternative.

Experiment A (Exp A) is considered a control in which the reinforcing filler is carbon black. Experiments B and C use the starch/plasticizer composite as a significant reinforcing filler with and without coupling agent. Experiment C uses the coupler with the starch/plasticizer composite, thereby reducing the amount of carbon black used when the coupling agent is used.

The formulations used are comprised of ingredients shown in the following Table 1.

The rubber compositions containing the materials illustrated in Table 1 were prepared in a BR Banbury rubber mixer using four separate, sequential stages of addition (mixing), namely, two non-productive mix stages, in which ingredients are added mixing an additional non-productive mixing stage without adding additional ingredients and one final productive mix to temperatures of 175° C., 165° C., 150° C. and 125° C., respectively, and times of 4 minutes, 4 minutes, 3 minutes, and 2 minutes, respectively. Only the coupler is added in the second non-productive mix stage with the starch composite.

TABLE 1

| Material | Exp A | Exp B | Exp C |
|---|---|---|---|
| 1st Non-Productive | | | |
| Styrene/butadiene rubber[1] | 61.88 | 61.88 | 61.88 |
| Styrene/butadiene rubber[2] | 61.88 | 61.88 | 61.88 |
| Natural rubber[3] | 10 | 10 | 10 |
| Carbon black[4] | 85 | 65 | 60 |
| Processing Oil[5] | 2.5 | 2.5 | 0 |
| Zinc Oxide | 4 | 4 | 4 |
| Fatty Acid[6] | 2 | 2 | 2 |
| Antioxidant[7] | 1.15 | 1.15 | 1.15 |
| 2nd Non-Productive | | | |
| Starch Composite[8] | 0 | 10 | 12 |
| Bis-(3-triethoxysilylpropyl) tetrasulfide[9] | 0 | 0 | 5 |
| Productive | | | |
| Sulfur | 1.3 | 1.3 | 1.3 |
| Accelerator, sulfenamide type | 2.5 | 2.5 | 2.5 |

[1] Styrene/butadiene copolymer elastomer, emulsion polymerization prepared with 40 percent styrene and containing 37.5 phr extender oil obtained as SBR 1721 from the Enichem company;
[2] Styrene/butadiene copolymer elastomer, emulsion polymerization prepared, having about 31.5 percent styrene and containing 37.5 phr extender oil obtained as Cariflex S5820 from the Shell company;
[3] Cis 1,4-polyisoprene natural rubber;
[4] N-234 carbon black;
[5] Of the high aromatic type;
[6] Primarily stearic acid;
[7] Of the mixed aryl-p-phenylenediamines type;
[8] A composite of starch and poly(ethylenevinyl alcohol) in a weight ratio of about 1.5/1 and having a softening point according to ASTM No. D1228 of about 147° C.; wherein the starch is composed of amylose units and amylopectin units in a weight ratio of about 1/3 and a moisture content of about 5 weight percent obtained as Mater Bi 1128R from the Novamont - Montedison company; and
[9] A coupler as a 50% active composite composed of an organosilane tetrasulfide on or with carbon black in a 50/50 weight ratio available as material X50S from Degussa GmbH. Technically the organosilane polysulfide is understood to be a composite, or mixture, in which the average polysulfide bridge contains about 3.5 to 4 connecting sulfur atoms, although the mixture may contain such polysulfides with about 2 to 8 connecting sulfur atoms.

EXAMPLE II

The cure behavior and cured properties for the compositions prepared in Example I are shown in the following Table 2.

It is evident that utilization of the coupling agent, for this formulation, appears to be desirable for suitable cured properties in a starch composite-containing rubber composition, or compound. Such properties include tensile strength at break, the 300% modulus value and rebound at 23° C. (Room Temperature) and at 100° C.

TABLE 2

| Sample # | Exp A | Exp B | Exp C |
|---|---|---|---|
| Rheometer (150° C.) | | | |
| Max. Torque, dNm | 32.3 | 24.0 | 31.8 |
| Min. Torque, dNm | 8.9 | 4.8 | 6.6 |
| Delta Torque | 23.4 | 19.2 | 25.2 |
| T$_{90}$, minutes | 11.3 | 15.7 | 13.3 |
| Stress-Strain | | | |
| Tensile Strength, MPa | 17.7 | 18.6 | 16.0 |
| Elongation at Break, % | 546 | 641 | 509 |

TABLE 2-continued

| Sample # | Exp A | Exp B | Exp C |
|---|---|---|---|
| 100% Modulus, MPa | 2.0 | 2.0 | 2.0 |
| 300% Modulus, MPa | 9.7 | 7.0 | 9.0 |
| Rebound | | | |
| 100° C., % | 47.0 | 54.0 | 61 |
| 23° C., % | 19 | 22 | 28 |
| Hardness | | | |
| Shore A, 100° C. | 66 | 61.0 | 61.0 |
| Storage Modulus (E) | | | |
| 10 Hz at 75° C., MPa | 4.1 | 2.5 | 3.4 |
| 10 Hz at 0° C., MPa | 19.7 | 10.0 | 11.9 |
| Tangent Delta | | | |
| 10 Hz at 75° C., MPa | 0.107 | 0.12 | 0.085 |
| 10 Hz at 0° C., MPa | 0.35 | 0.40 | 0.33 |

The storage modulus (75° C.), 300% modulus and tangent delta at 0° C. and 75° C. demonstrate that the starch/plasticizer composite, with the silica coupler, can be beneficially used as a partial replacement of, the carbon black reinforcement. This is because, for example, the elastomer reinforcement property of the starch/plasticizer composite allows a tuning, or adjusting, the stiffness (300% modulus) of the rubber composition for keeping a high tan. delta at 0° C. This is considered to be important for the tan. delta of 0° C. because the 0° C. tan. delta value is predictive of the wet traction tire tread properties.

Also, the stress-strain properties, (namely, the 300% modulus and storage modulus (E) at 75° C. properties) also demonstrate that when no coupling agent is used with the starch/plasticizer composite, its reinforcing properties, as identified by the 300% modulus, are not maximized. Thus, for practical purposes, the use of the starch/plasticizer composite enables a preparation of a lower hysteresis compound for predictive tire lower rolling resistance (as evidenced by the tan. delta at 75° C.) with predictive improved or at least about equal wet tire tread properties (such as wet traction tire tread properties) associated with a maintained tan. delta at 0° C. with a lower compound hardness (as evidenced by Shore A hardness property) and storage modulus (E) at 0° C.

EXAMPLE III

Tires of size 195/65R15 were prepared with treads of the Control Sample A and Experimental Sample C compositions of Example I with Tire 1 and Tire 2 corresponding the aforesaid Sample A and Sample C, respectively.

The tires were tested by conventional tire testing procedures with results shown in the following Table 3. The values for the Control Tire 1 are normalized to values of 100 and the associated values for Experimental Tire 2 are recited with values comparative to the values for the Control Tire 1, with higher values being preferred.

TABLE 3

| Test Values | Tire 1 | Tire 2 |
|---|---|---|
| Rolling resistance | 100 | 109 |
| Treadwear at 10,000 km | 100 | 100 |
| Wet Skid | | |
| Wet skid, low mu | 100 | 98 |
| Wet skid, low mu ABS | 100 | 110 |

TABLE 3-continued

| Test Values | Tire 1 | Tire 2 |
|---|---|---|
| Wet skid, ABS, high mu | 100 | 107 |
| Wet skid, high mu | 100 | 100 |
| Dry Handling | | |
| Steering precision | 100 | 118 |
| Steering response | 100 | 103 |
| Response curve | 100 | 100 |
| Response curve | 100 | 100 |
| Wet Handling | | |
| Wet oversteering | 100 | 125 |
| Wet understeering | 100 | 130 |

The higher rolling resistance values (actually indicating lower resistance to rolling) are indicative of improved tire properties and demonstrate that the use of the starch/plasticizer composite contributes to such improvement.

The wet traction value(s) are indicative of improved wet skid properties and demonstrate that the use of the starch/plasticizer composite allows an advantageous tuning of the compound stiffness and hysteresis profile from a low to a high temperature condition.

The treadwear value(s) are indicative of maintained wear properties for the tire tread and demonstrates that with a reduced carbon black content in the rubber composition for the tire tread, the starch/plasticizer composite filler contributes as an additive to maintain the tire tread's treadwear performance.

The improvement in dry and wet handling test value(s) are associated with the reinforcing properties of the starch/plasticizer composite. The reinforcing property of the starch/plasticizer composite is considered herein to enable the preparation of an elastomer composition with a relatively high 300% modulus while maintaining a relatively low rubber composition hardness with sufficient dynamic property at zero degrees (which is considered herein to be a significant requisite for a tire tread with good dry, wet handling and wet skid properties.

For the above reported values, the rolling resistance can be determined, for example, by using standard test conditions. A higher reported value for the rolling resistance means a lower, or improved, rolling resistance which may translate into better fuel economy for the vehicle.

The wet traction rating can be determined by comparing tire wet skid properties when mounted on a wheel of a passenger automobile. In practice, tires are mounted on 4 wheels of the car. The car is run on various surfaces on a road (or track) or circuit at defined speeds. For wet skid resistance measurements, water is poured, or sprayed, onto the surface before the test is conducted. The brakes of the car are applied and the distance for the car to stop is measured and compared to a control tire. This overall procedure is believed to be somewhat of an industry standard method of measuring skid resistance, whether on a wet surface or dry surface. A lower reported value means less traction, or skid resistance. Generally, a higher value is preferred.

Various surfaces can be used for the traction tests from low to high mu rugosity.

The term "mu rugosity" means "the variations in level and type of road asperity".

In particular, the "wet skid asphalt, low mu ABS" test was conducted by driving the automobile on a low mu surface. The term "low mu" means "low surface rugosity". The term "ABS" refers to "an anti-blocking wheel system on the automobile".

The "wet skid high mu" test was conducted on a test circuit. The term "high mu" means "on a high rugosity surface".

Treadwear can be measured by mounting tires on metal rims and mounting the resultant wheel assembly on a vehicle and the vehicle run for at least about 10,000 km. The differences in tread groove depth (from the top to the bottom of a tread groove) for the original tire is compared to the control tire. A higher value means longer tread life.

The dry handling tests were conducted by mounting the tires on the wheel (wheels, or which wheel) of an automobile. The automobile is driven by a driver over usual road, or track, and the dry handling results are reported by the driver as a subjective evaluation. A higher value means improved handling characteristics as compared to the control tire.

In particular, the term "steering precision" means "a tire's response precision, when mounted on a wheel(s) of an automobile and driven by a driver over a road, or track, around a zero degree angle input provided by the car driver". A higher value means an improved steering precision. The term "steering response" means the tire response time around the "zero angle". The term "zero angle" means "the tire direction from a straight line". Thus, the tire is traveling in a straight line. This is a subjective evaluation by the driver. A higher value means an improvement in tire response time at the zero degree angle, namely, less time for a given response to the driver's input.

The term "response curve" means the tire response for the tire in terms of response time to a driver's input when mounted on an automobile and the automobile driven around a defined road curve at a controlled vehicular speed. A higher value means an improved response time when adjusting the tire direction on a curve by the driver.

The wet handling tests were conducted by mounting the tire on a wheel of an automobile, or car, (e.g. a Mercedes 300 E type) and the car driven on a road, or watered sprayed track, by a driver. This is a subjective evaluation by the driver. A higher value means improved handling properties or tire response and precision.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition is provided which comprises (A) 100 parts by weight of at least one diene-based elastomer, (B) about 0.1 to about 120 phr of at least one reinforcing filler for said elastomer(s) comprised of at least one starch/synthetic plasticizer composite and (C) a coupler for said starch composite, where said coupler has a moiety reactive with hydroxyl groups contained on the surface of said starch composite and another moiety interactive with the said elastomer; wherein said starch is composed of amylose units and amylopectin units in a ratio of about 15/85 to about 35/65, and has a softening point according to ASTM No. D1228 in a range of about 180° C. to about 220° C. provided, however, that said starch/plasticizer composite has a softening point in a range of about 110 to about 160° C. according to ASTM No. D1228.

2. The rubber composition of claim 1 containing about 25 to about 90 phr of said reinforcing filler (B) where said reinforcing filler is composed of (i) about 5 to about 70 phr of said starch/plasticizer composite and about 20 to about 85 phr of reinforcing carbon black.

3. The rubber composition of claim 1 containing about 25 to about 90 phr of said reinforcing filler (B) where said reinforcing filler is composed of (i) about 5 to about 70 phr of said starch/plasticizer composite and (ii) about 20 to about 85 phr of precipitated silica and carbon black, wherein the weight ratio of silica and carbon black is in a range of about 0.1 to about 10/1, and a said coupler (C) as a coupler for (1) both of said starch/plasticizer composite and said silica to (2) said elastomer(s) by having a moiety reactive with one or more hydroxyl groups on said composite and with said silica and another moiety reactive with said elastomer(s).

4. The rubber composition of claim 1 containing about 25 to about 90 phr of said reinforcing filler (B) composed of (i) about 5 to about 70 phr of said starch/plasticizer composite, (ii) zero to about 85 phr of carbon black and/or precipitated silica, wherein the weight ratio of silica to carbon black, if silica is used, is in a range of about 0.1 to about 10/1, (iii) together with zero to about 85 phr of at least one additional reinforcing and/or non-reinforcing filler; wherein said coupler (C) is a coupler for (1) both of said starch/plasticizer composite and of said silica, if silica is used, to (2) said elastomer(s) by having a moiety reactive with one or more hydroxyl groups on said starch/plasticizer composite and said silica and another moiety reactive with said elastomer(s).

5. The rubber composition of claim 4 wherein said additional filler is selected from at least one of vulcanized rubber particles, short fibers, kaolin clay, mica, talc, titanium oxide and limestone.

6. The rubber composition of claim 4 wherein said short fibers are selected from fibers of at least one of nylon, aramid, polyester and cellulose material.

7. The rubber composition of claim 1 wherein said plasticizer is a liquid at 23° C. and is selected from at least one of poly(ethylenevinyl alcohol), cellulose acetate and plasticizers based, at least in part, upon diesters of dibasic organic acids and forms said starch/plasticizer composite having a softening point in a range of about 110° to about 160 ° C. when combined with said starch in a weight ratio in a range of about 1/1 to about 2/1.

8. The rubber composition of claim 2 wherein said plasticizer is a liquid at 23° C. and is selected from at least one of poly(ethylenevinyl alcohol), cellulose acetate and plasticizers based, at least in part, upon diesters of dibasic organic acids and forms said starch/plasticizer composite having a softening point in a range of about 110° C. to about 160° C. when combined with said starch in a weight ratio in a range of about 1/1 to about 2/1.

9. The rubber composition of claim 3 wherein said plasticizer is a liquid at 23° C. and is selected from at least one of poly(ethylenevinyl alcohol), cellulose acetate and plasticizers based, at least in part, upon diesters of dibasic organic acids and forms said starch/plasticizer composite having a softening point in a range of about 110° C. to about 160° C. when combined with said starch in a weight ratio in a range of about 1/1 to about 2/1.

10. The rubber composition of claim 4 wherein said plasticizer is a liquid at 23° C. and is selected from at least one of poly(ethylenevinyl alcohol), cellulose acetate and plasticizers based, at least in part, upon diesters of dibasic organic acids and forms said starch/plasticizer composite having a softening point in a range of about 110° C. to about 160° C. when combined with said starch in a weight ratio in a range of about 1/1 to about 2/1.

11. The rubber composition of claim 5 wherein said plasticizer is a liquid at 23C. and is selected from at least one of poly(ethylenevinyl alcohol), cellulose acetate and plasticizers based, at least in part, upon diesters of dibasic organic acids and forms said starch/plasticizer composite having a softening point in a range of about 110° C. to about 160° C. when combined with said starch in a weight ratio in a range of about 1/1 to about 2/1.

12. The rubber composition of claim 1 wherein said plasticizer has a softening point of less than the said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90, alternatively about 20 to about 70, percent, ethylene-glycidal acrylate copolymers and ethylene-maleic anhydride copolymers.

13. The rubber composition of claim 2 wherein said plasticizer has a softening point of less than the said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90, alternatively about 20 to about 70, percent, ethylene-glycidal acrylate copolymers and ethylene-maleic anhydride copolymers.

14. The rubber composition of claim 3 wherein said plasticizer has a softening point of less than the said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90, alternatively about 20 to about 70, percent, ethylene-glycidal acrylate copolymers and ethylene-maleic anhydride copolymers.

15. The rubber composition of claim 4 wherein said plasticizer has a softening point of less than the said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90, alternatively about 20 to about 70, percent, ethylene-glycidal acrylate copolymers and ethylene-maleic anhydride copolymers.

16. The rubber composition of claim 5 wherein said plasticizer has a softening point of less than the said starch and less than 160° C. and is selected from at least one of poly(ethylenevinyl alcohol), cellulose acetate and copolymers, and hydrolyzed copolymers, of ethylene-vinyl acetate copolymers having a vinyl acetate molar content of from about 5 to about 90, alternatively about 20 to about 70, percent, ethylene-glycidal acrylate copolymers and ethylene-maleic anhydride copolymers.

17. The rubber composition of claim 1 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

18. The rubber composition of claim 2 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

19. The rubber composition of claim 3 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

20. The rubber composition of claim 4 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

21. The rubber composition of claim 5 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

22. The rubber composition of claim 6 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

23. The rubber composition of claim 7 wherein said diene based elastomer is selected from at least one of homopolymers of isoprene and 1,3-butadiene and copolymers of isoprene and/or 1,3-butadiene with a aromatic vinyl compound selected from at least one of stryene and alphamethylstyrene.

24. The rubber composition of claim 8 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

25. The rubber composition of claim 9 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

26. The rubber composition of claim 10 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

27. The rubber composition of claim 11 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

28. The rubber composition of claim 12 wherein said diene based elastomer is selected from at least one of homopolymers of isoprene and 1,3-butadiene and copolymers of isoprene and/or 1,3-butadiene with a aromatic vinyl compound selected from at least one of stryene and alphamethylstyrene.

29. The rubber composition of claim 13 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

30. The rubber composition of claim 14 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

31. The rubber composition of claim 15 wherein said diene based elastomer is selected from at least one of homopolymers of isoprene and 1,3-butadiene and copolymers of isoprene and/or 1,3-butadiene with a aromatic vinyl compound selected from at least one of styrene and alphamethylstyrene.

32. The rubber composition of claim 1 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

33. The rubber composition of claim 2 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

34. The rubber composition of claim 3 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

35. The rubber composition of claim 4 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

36. The rubber composition of claim 5 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

37. The rubber composition of claim 6 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

38. The rubber composition of claim 7 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

39. The rubber composition of claim 8 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

40. The rubber composition of claim 9 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

41. The rubber composition of claim 10 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

42. The rubber composition of claim 11 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

43. The rubber composition of claim 12 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

44. The rubber composition of claim 13 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

45. The rubber composition of claim 14 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

46. The rubber composition of claim 15 wherein the diene based elastomer is selected from at least one of cis 1,4-polyisoprene rubber, 3,4-polyisoprene rubber, styrene/butadiene copolymer rubbers, isoprene/butadiene rubber, styrene/isoprene/butadiene terpolymer rubbers, cis 1,4-polybutadiene rubber, medium vinyl polybutadiene rubber, high vinyl polybutadiene rubber having a vinyl content in a range of about 15 to about 85 percent and emulsion polymerization prepared styrene/butadiene/acrylonitrile terpolymer rubber and butadiene/acrylonitrile copolymer rubber.

47. A tire having at least one rubber component wherein said component is comprised of the rubber composition of claim 1.

48. A tire having at least one rubber component wherein said component is comprised of the rubber composition of claim 2.

49. A tire having at least one rubber component wherein said component is comprised of the rubber composition of claim 3.

50. A tire having at least one rubber component wherein said component is comprised of the rubber composition of claim 4.

51. A tire having at least one rubber component wherein said component is comprised of the rubber composition of claim 5.

52. A tire having at least one rubber component wherein said component is comprised of the rubber composition of claim 6.

53. A tire having at least one rubber component wherein said component is comprised of the rubber composite, on of claim 7.

54. A tire having at least one rubber component wherein said component is comprised of the rubber composition of claim 8.

55. A tire having at least one rubber component wherein said component is comprised of the rubber composition of claim 9.

56. A tire having at least one rubber component wherein said component is comprised of the rubber composition of claim 10.

57. A tire having at least one rubber component wherein said component is comprised of the rubber composition of claim 11.

58. A tire having at least one rubber component wherein said component is comprised of the rubber composition of claim 12.

59. A tire having at least one rubber component wherein said component is comprised of the rubber composition of claim 13.

60. A tire having at least one rubber component wherein said component is comprised of the rubber composition of claim 14.

61. A tire having at least one rubber component wherein said component is comprised of the rubber composition of claim 15.

62. A tire having at least one rubber component wherein said component is comprised of the rubber composition of claim 16.

63. A tire having at least one rubber component wherein said component is comprised of the rubber composition of claim 17.

64. A tire having at least one rubber component wherein said component is comprised of the rubber composition of claim 18.

65. A tire having at least one rubber component wherein said component is comprised of the rubber composition of claim 19.

66. A tire having at least one rubber component wherein said component is comprised of the rubber composition of claim 20.

67. The tire of claim 47 wherein said tire component is at least one of a circumferential tread designed to ground-contacting and sidewall apexes.

68. The tire of claim 48 wherein said tire component is at least one of a circumferential tread designed to ground-contacting and sidewall apexes.

69. The tire of claim 49 wherein said tire component is at least one of a circumferential tread designed to ground-contacting and sidewall apexes.

70. The tire of claim 50 wherein said tire component is at least one of a circumferential tread designed to ground-contacting and sidewall apexes.

71. The tire of claim 51 wherein said tire component is at least one of a circumferential tread designed to ground-contacting and sidewall apexes.

72. The tire of claim 52 wherein said tire component is at least one of a circumferential tread designed to ground-contacting and sidewall apexes.

73. The tire of claim 53 wherein said tire component is at least one of a circumferential tread designed to ground-contacting and sidewall apexes.

74. The tire of claim 54 wherein said tire component is at least one of a circumferential tread designed to ground-contacting and sidewall apexes.

75. The tire of claim 55 wherein said tire component is at least one of a circumferential tread designed to ground-contacting and sidewall apexes.

76. The tire of claim 56 wherein said tire component is at least one of a circumferential tread designed to ground-contacting and sidewall apexes.

77. The tire of claim 57 wherein said tire component is at least one of a circumferential tread designed to ground-contacting and sidewall apexes.

78. The tire of claim 58 wherein said tire component is at least one of a circumferential tread designed to ground-contacting and sidewall apexes.

79. The tire of claim 59 wherein said tire component is at least one of a circumferential tread designed to ground-contacting and sidewall apexes.

80. The tire of claim 60 wherein said tire component is at least one of a circumferential tread designed to ground-contacting and sidewall apexes.

81. The tire of claim 61 wherein said tire component is at least one of a circumferential tread designed to ground-contacting and sidewall apexes.

82. The tire of claim 62 wherein said tire component is at least one of a circumferential tread designed to ground-contacting and sidewall apexes.

83. The tire of claim 63 wherein said tire component is at least one of a circumferential tread designed to ground-contacting and sidewall apexes.

84. The tire of claim 64 wherein said tire component is at least one of a circumferential tread designed to ground-contacting and sidewall apexes.

85. The tire of claim 65 wherein said tire component is at least one of a circumferential tread designed to ground-contacting and sidewall apexes.

86. The tire of claim 66 wherein said tire component is at least one of a circumferential tread designed to ground-contacting and sidewall apexes.

87. The rubber composition of claim 1 where said coupler is a trialkoxyorganosilane polysulfide containing from 2 to 8 sulfur atoms in a polysulfide bridge.

88. The rubber composition of claim 1 where said coupler is bis-(3-triethoxysilylpropyl) tetrasulfide and/or trisulfide.

89. The rubber composition of claim 3 where said coupler is a trialkoxyorganosilane polysulfide containing from 2 to 8 sulfur atoms in a polysulfide bridge.

90. The rubber composition of claim 3 where said coupler is bis-(3-triethoxysilylpropyl) tetrasulfide and/or trisulfide.

* * * * *